Sept. 5, 1939.   R. W. THOMAS   2,172,310
SELF-SERVICE SYSTEM FOR STORAGE AND UTILIZATION OF FUEL GASES
Filed Sept. 21, 1936   4 Sheets-Sheet 1

INVENTOR.
ROSSWELL W. THOMAS
BY Hudson, Conner and Young
ATTORNEYS.

Sept. 5, 1939.   R. W. THOMAS   2,172,310
SELF-SERVICE SYSTEM FOR STORAGE AND UTILIZATION OF FUEL GASES
Filed Sept. 21, 1936   4 Sheets-Sheet 2

INVENTOR.
ROSSWELL W. THOMAS
BY Hudson, Conver and Young
ATTORNEYS.

INVENTOR.
ROSSWELL W. THOMAS
BY Hudson, Conver and Young
ATTORNEYS.

Sept. 5, 1939. R. W. THOMAS 2,172,310
SELF-SERVICE SYSTEM FOR STORAGE AND UTILIZATION OF FUEL GASES
Filed Sept. 21, 1936 4 Sheets-Sheet 4
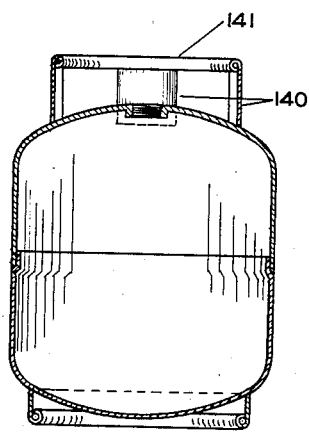
Fig. 16
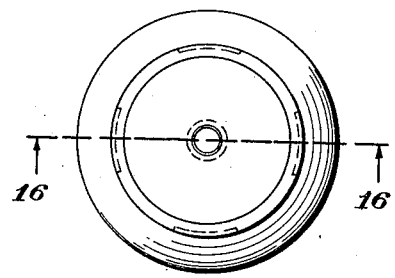
Fig. 17
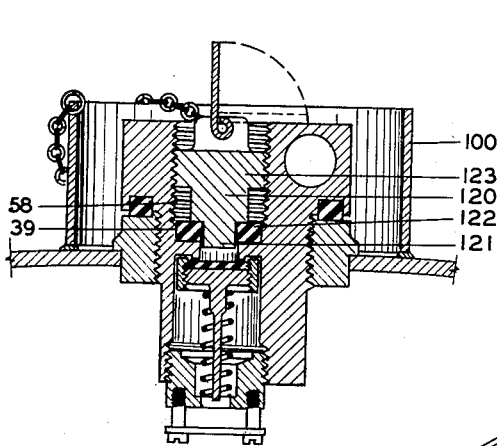
Fig. 18
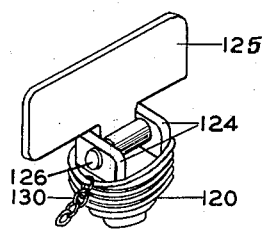
Fig. 19
Fig. 20
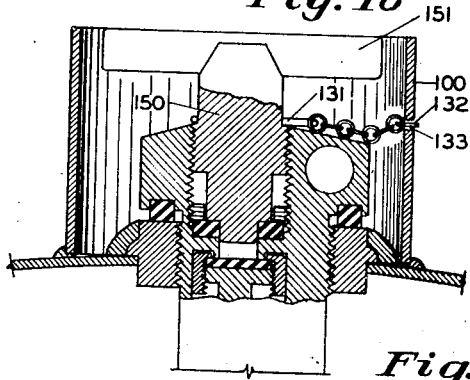
Fig. 21
INVENTOR.
ROSSWELL W. THOMAS
BY Hudson, Connerand Young
ATTORNEYS.

Patented Sept. 5, 1939

2,172,310

UNITED STATES PATENT OFFICE 2,172,310

SELF-SERVICE SYSTEM FOR STORAGE AND UTILIZATION OF FUEL GASES

Rosswell W. Thomas, Detroit, Mich., assignor to Phillips Petroleum Company, a corporation of Delaware Application September 21, 1936, Serial No. 101,859

12 Claims. (Cl. 221—73.5)

This invention relates to storage and utilization of fuel gas.

More particularly this invention relates to a self-service system for storage and utilization of liquefied gases or gases under high pressures for use in home appliances or for industrial uses.

There has, in the past, been developed a large industry furnishing gaseous fuel to consumers living beyond city gas mains, in individual containers which may be connected to service lines leading to the consumer's appliances.

Heretofore units for storing and dispensing the gas have been large and cumbersome and generally, of necessity, have required a service by the seller to deliver the containers, make the necessary connections to the service and disconnection of depleted containers therefrom. While this service was satisfactory from an economic standpoint in communities affording a large number of consumer customers, it practically precluded the expansion of the service to more sparsely settled communities, or to those communities in which the consumer percentage of the population was not large.

Attempts have been made in the past to solve the problem in a satisfactory manner, both from consumer and service standpoint, but systems devised have in general been subject to one or more of the following disadvantages, among others:

1. The equipment was too cumbersome;
2. The equipment was too complicated;
3. The equipment generally required mechanical ability on the part of the consumer-operator for satisfactory operation.

The problem thus confronted the industry of devising a satisfactory, economical unit susceptible of complete consumer operation.

Applicant has devised a system in which the service can be completely taken care of by the consumer himself. The consumer merely purchases one or more containers according to his demands, from a conveniently located store or supply depot much the same as he would purchase a can of kerosene, or other supplies. The unit has been so simplified, while at the same time maintaining devices providing an excellent factor of safety, that any person in the consumer's household, including women and grown children, can remove a depleted drum or container and install a new one with no difficulty.

This has been accomplished by greatly simplifying the system in many ways, by providing hand operated taps and connecters, fool-proof safety devices, and by reducing the container size so that it may be easily handled and conveniently transported.

One object of applicant's invention is to provide a simplified self-service system for storage and utilization of gaseous fuel.

Another object of applicant's invention is to provide such a system which will be compact, safe, and easy of operation.

Still another object of applicant's invention is the provision of such a system which will need little or no care between times of replenishing of supply.

A further object of applicant's invention is the provision of such a system which will be difficult to tamper with and substantially foolproof.

A still further object of applicant's invention is the provision of a valved connecter which will be hand operable, no tools being required.

A still further object of applicant's invention is the provision of a combined valved connecter and safety-relief appliance.

Another object of applicant's invention is the provision of a valved connecter including an excess flow check valve which can readily be rendered inoperative when it is desired to empty the container rapidly.

Further objects of applicant's invention include the provision of a protecting device for exposed parts, a simple and efficient support for gas containers, and a means to lock the unit in assembled position.

Still other objects and advantages of applicant's invention will be apparent from the following detailed description in conjunction with the accompanying drawings forming a part thereof, in which.

Figures 2, 3, 4:
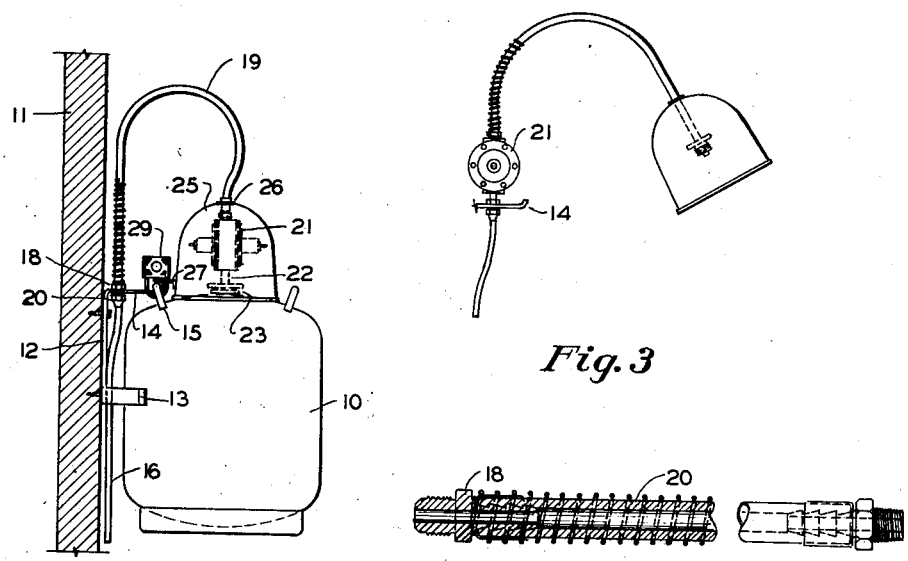
Fig. 2 is an elevational view of a container mounted for use.
Fig. 3 is a view of a modification of applicant's invention.
Figure 5:
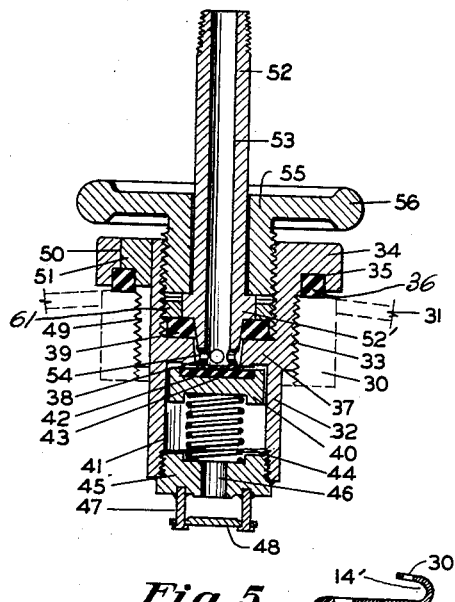
Figure 6:
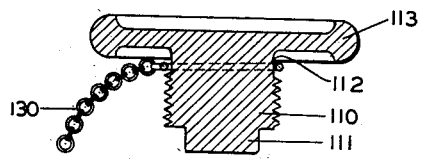
Figure 7:
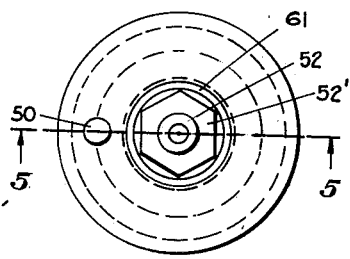
Figure 8A:
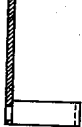
Figure 8:
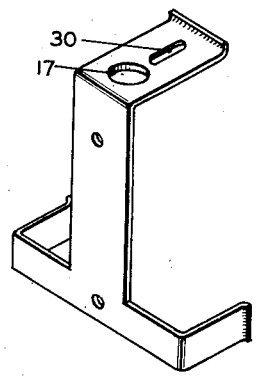
Figure 9:
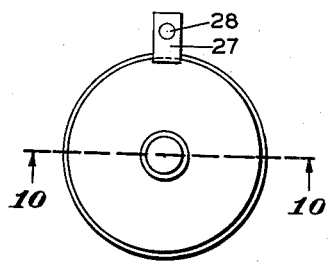
Figure 10:
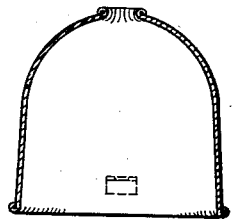
Figure 11:
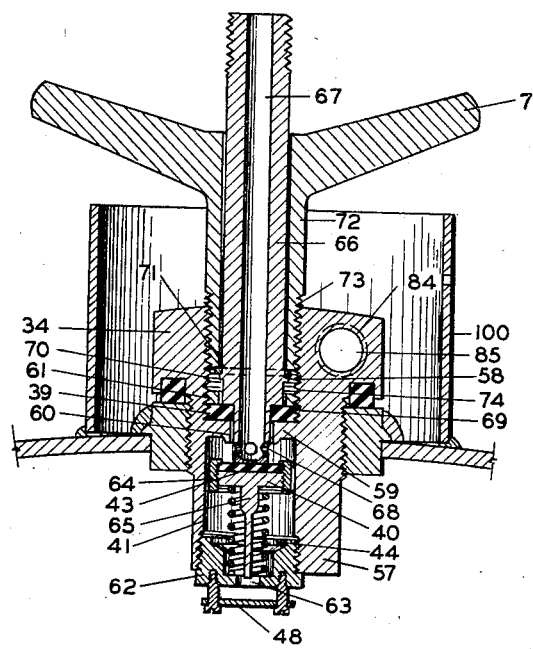
Figure 13:
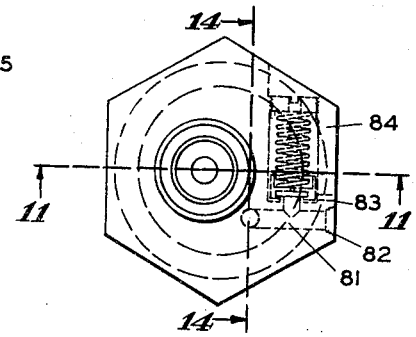
Figure 14:
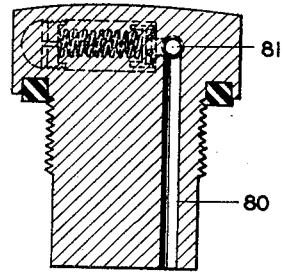
Figure 12:
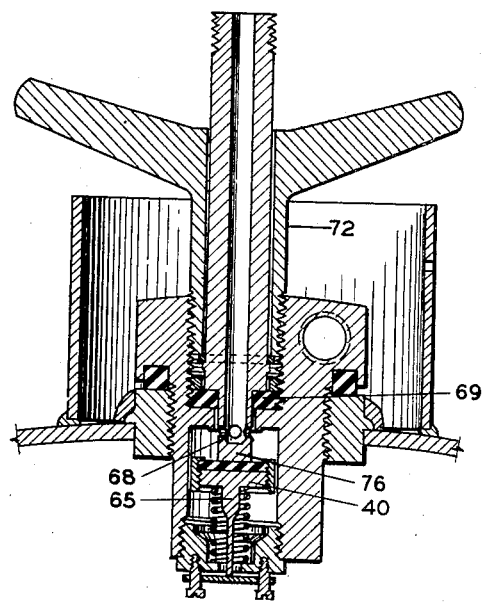
Figure 15:
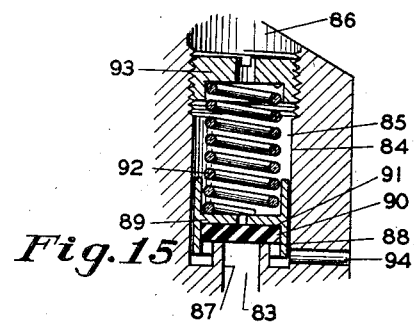

Fig. 4 is a view, partly in section, illustrating a form of flexible tubing which may be employed, Fig. 5 is a sectional view of one form of applicant's valved connecter taken on the line 5—5 of Fig. 7, Fig. 6 is a sectional view of a plug which may be employed with the connecter, Fig. 7 is a plan view of the connecter illustrated in Fig. 5 omitting the gland, Fig. 8 is an isometric view of one form of support for the cylinder, Fig. 8—A is a sectional view of another form of support for the cylinder, Fig. 9 is a plan view of the cap shown in Fig. 2, Fig. 10 is a sectional view taken on the line 10—10 of Fig. 9, Fig. 11 is a sectional view of a preferred form of connecter-tap, taken on line 11 of Fig. 13 and showing the associated container structure, Fig. 12 is a sectional view of the preferred form of applicant's tap with a different connecter in place, Fig. 13 is a plan view of the tap shown in Fig. 11, omitting the gland, Fig. 14 is a sectional view taken on line 14—14 of Fig. 13, Fig. 15 is an enlarged sectional view of the pressure relief valve shown in Fig. 13, Fig. 16 is a sectional view taken on line 16—16 of Fig. 17 of one form of container which may be employed.

Fig. 17 is a plan view of the container shown in Fig. 16,

Fig. 18 is a sectional view illustrating applicant's tap with a plug in place,

Fig. 19 is a perspective view of the plug shown in Fig. 18, and

Fig. 20 is a perspective view of still another form of plug,

Fig. 21 is a view, partly in section, illustrating applicant's tap with another form of plug in place.

It is to be understood that the accompanying drawings merely illustrate preferred embodiments, and that applicant does not wish to be restricted thereto except as dictated by the subjoined claims.

Figure 1:
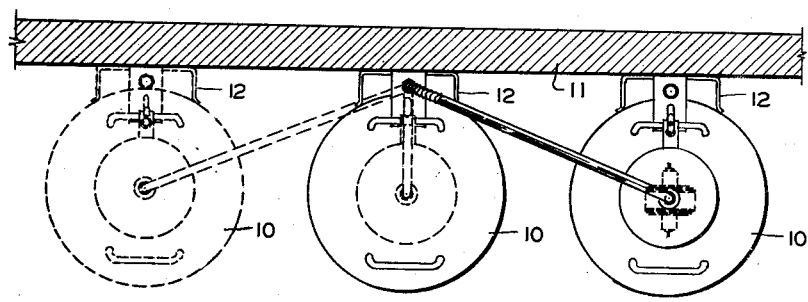
Fig. 1 is a plan view of one embodiment of applicant's system.

Referring particularly to Fig. 1 there is shown a plurality of cylinders or containers 10 for gaseous fuel which may be in the form of liquefied petroleum gases or other fuel under compression, adapted to be mounted on a wall or other supporting surface 11 by means of supporting brackets 12 having wing portions 13 (Fig. 2) to steady the containers 10 and a hook portion 14 adapted to engage a handle 15 secured to the cylinder 10. It is to be understood that whereas three cylinders or containers 10 are shown in Fig. 1, that one only will often be sufficient to supply the consumer's demand and that the average consumer will not require over two. Three or more may be desirable in the case of a large consumer or where the consumer is located in a remote section thus limiting the number of trips to a store or supply depot for renewals.

A consumer's supply line or conduit leading to consumer appliances is shown at 16 and extends flush with the underside of the bracket hook 14 in line with an aperture 17 (Fig. 8) through which a coupling 18 of a flexible tube or hose 19 extends, and which is coupled in sealing engagement with a complemental coupling 20 on the conduit 16. Whereas the supply line and flexible conduit, together with the coupling between, are shown mounted on the supporting bracket, it is to be understood that they may be mounted elsewhere, as for instance between brackets on the supporting wall, as by staples or other means.

The tube 19 is of sufficient length to extend to any of the containers employed, and is provided on its free end with a regulator 21 of known type to which is attached a connecter 22 adapted to cooperate in sealing relation with a valved tap 23 in the container bung hole to withdraw the contents thereof. A cap 25 is loosely mounted on the tubing 19 intermediate the regulator 21 and a flange 26 and may be of sheet metal or other suitable material, and may be provided on its surface with a lug 27 provided with an opening 28 (Fig. 9) therein for a purpose subsequently to be described. The cap 25 serves to protect the regulator, connecter and valved tap from the elements, injury, or an unauthorized tampering with the connecter and tap. A padlock 29 has its shackle extending through the aperture 28 in the lug 27, the handle of the container 10 and an aperture 30 in the bracket hook 14 to secure the bracket, container and cap in locked relation. It is to be understood that the hood need not be locked to the container and bracket if not desired. In Fig. 8—A there is illustrated a modified form of bracket in which the hook portion 14 is reversely bent as at 14', the reversely bent portion being provided with an aperture 30' through which the shackle of the padlock 29 may be inserted. In this type of bracket, the shackle need only pass through the aperture 28 in the cap lug 27 and the aperture 30' in the reversely bent portion, since it is impossible to remove the container handle from within the reversely bent portion 14' with the shackle in place. The arrangement illustrated in Fig. 8—A possesses the following additional advantages, among others:

1. Relatively easy insertion and removal of shackle,
2. Lock may be used either right or left handed,
3. Lock may hang with its keyhole extending downwardly thus protecting it from entry of water, sleet or snow.

It will now be apparent that gas from the container is in communication with the service line 16 through the pressure regulator 21. In the case of liquefied petroleum gases the pressure in the container is relatively high but is reduced by the pressure regulator to a suitable value for delivery to the consumer appliances. Therefore, when the regulator is placed in the position shown in Fig. 2 the hose is under low pressure, whereas when in the position shown in Fig. 3 it is under a high pressure and consequently high pressure, flexible tubing or hose must be employed.

Because of the high pressure normally existing in the container 10, it is necessary to provide an adequate and safe mechanism for tapping the container and for connecting the flexible hose thereto so that the contents can be removed.

One embodiment of such a device is shown in Fig. 5. A container bung ring 30 is indicated in the wall 31 of the container 10, in which is secured a tap body 32, as by screwthreads 33, provided with a flange 34 having an annular groove 35 on its under side in which is seated a gasket 36 of rubber or any other suitable material for insuring a fluid-tight seal between the tap body 32 and the container bung ring.

Indicated at 37 is a flange or seat projecting internally of the tap and apertured as at 38, the upper side of which provides a seat for a gasket 39, of rubber or other suitable packing material, and the under or lower side of which provides a seat for a disc-valve 40, slideably mounted in a valve chamber 41 in the lower portion of the tap. A lock nut or follower 61 is shown for retaining gasket 39 in position. The valve 40 is recessed on one side as indicated at 42 to receive a gasket 43, likewise of rubber or other material, which is adapted to engage the under side of the flange or seat 37 under the action of a spring or other suitable loading means 44, to seal the aperture 38 and thus prevent the egress of fluid from the container. The lower end of the valve chamber 41 is closed as by a plug 45, which may be screwthreaded therein, or secured in any convenient manner, provided with an aperture 46 placing the valve chamber 41 in communication with the container interior. Pins 47, which may be in the form of studs or may be welded to the plug 45 or secured thereto in any convenient manner, project therefrom and serve to guide and hold in position a check valve 48 so positioned over the aperture 46 that under normal flow of fluid therethrough, gravity will maintain the valve in open position, but upon flow beyond a predetermined rate, such as would be caused by failure of the flexible hose or consumer's line, the increased flow rate will cause the valve 48 to close thus preventing loss of the container contents, which otherwise would be serious not only because of the value thereof but also because of the fire hazard produced thereby. Likewise, should the container be turned upside down, or should it fall over on its side while the valve is open, gravity will close the flap or check valve, or in the case where the container merely falls on its side, at least partially close the valve, to entirely stop or reduce the flow rate. It is to be noted that in these cases the valve operates independently of the rate of flow. Indicated at 49 is a groove formed longitudinally in the body 32 in line with an opening 50 in the flange 34 which is normally closed as by a fusible plug 51. It is to be noted that whereas a groove is shown connecting the opening 50 with the contents of the container, a bore in the plug body or other equivalent means may be substituted therefor. Should the container be exposed to excessive temperatures the fusible plug will melt thus allowing the contents to escape. It is to be noted that this emergency vent is not controlled by the check valve 48 and thus is free to perform its function at all times.

It will now be apparent that with the valve in the position shown the container is sealed against egress of fluid therefrom. Upon delivery to the consumer, however, it is necessary to tap the container and at the same time couple the pressure regulator 21 and flexible hose to the tap body. This is accomplished by means of the connecter 22 previously mentioned.

The connector is in the form of a nipple 52 provided with a flange 52' adjacent one end thereof and having a passage 53 extending therethrough communicating with lateral ports 54 and adapted to cooperate with the tap 23, above described, to tap the container. The nipple 52 is tapered externally from the flange to its lower extremity for a purpose to appear later.

A screwthreaded gland or follower 55 provided with a handwheel 56 is adapted to be screwthreaded into the upper end of the tap body 32 and to engage the flange 52' on the nipple 52 to force the latter into operating position.

In operation, the nipple 52 with the gland positioned thereover is inserted by hand into the tap body 32 until engagement with the gasket 39 is secured. The gland is then screwed into the body and against gasket 39 thus forcing the tapered portion of the nipple to spread the gasket and form a seal therewith prior to contact with the valve 40. Upon further tightening of the gland 55 the lower extremity of the nipple 52 contacts the valve 40 thereby unseating the same against the action of spring 44. The container contents are now in communication with the flexible tubing through the ports 54 and passage 53. It will be noted that since the seal between the nipple 52 and the gasket 39 is made prior to opening of the valve 40 none of the contents of the container is lost in the tapping operation.

A preferred tapping mechanism is shown in Figs. 11 and 15 in which numeral 57 indicates a tap body. A passage extends through said body in eccentric relation to the axis thereof and comprises a valve chamber 41 and a packing chamber 58 separated by a flange 59 provided with an aperature 60 placing the chambers in communication. A gasket 39 is seated upon the upper surface of the flange 59 as in the previous embodiment and may be retained in position by a lock nut or follower 61. A nut 62 provided with an aperture 63 is secured in the lower end of the tap body 57 partially to close the same and to provide a seat for the spring 44 which actuates the valve 40 as in the previous modification. The valve 40 is slideably mounted in the chamber 41 and is provided with a gasket 43 secured to the upper face of the valve as by a nut 64 and adapted to seat against the under side of the flange 59 to seal the passageway through the tap. A stem 65 is formed on the lower side of the valve 40 and extends through the spring 44 for a purpose to be explained later. The check valve 48 has been described in connection with the first embodiment.

In this embodiment, the connecter 22 is in the form of a nipple 66 provided with a bore 67 communicating with lateral ports 68 formed adjacent the lower or operating extremity of the nipple. As in the case of the embodiment previously described, the lower end of the nipple is tapered. A gasket-engaging shoulder 69 supplants the flange 52 and is formed by reducing the diameter of the nipple to form the tapered end. A flange 70 in the form of an annular enlargement on the nipple 66 and which may or may not have associated therewith a bearing ring 71 free to rotate, provides a stop against which a follower or gland nut 72 may abut to force and hold the nipple in operating position. This gland nut is exteriorly screwthreaded as at 73 to engage screwthreads 74 formed in the chamber 58 and is provided with laterally extending wings 75 for easy operation thereof. It is to be understood that the gland nut 72 surrounds the nipple connecter 66 and may be positioned prior to forming the connection between the fuel line and the nipple.

In operation, the nipple is first inserted by hand until the tapered end fits snugly in the gasket 39, whereupon the gland is screwed into the tap body to force the tapered extremity into sealing engagement with the gasket and then to unseat the valve 40 thus placing the container contents in communication with the consumer's appliances.

With the connecter just described, the distance between the shoulder and the nipple extremity is such that the valve will be depressed, when full engagement is secured, only sufficiently to unseat the same without extending the stem 65 into engagement with the flapper or check valve 48. When it is desired rapidly to drain the contents of the container, however, to empty the same for any purpose, the nipple shown in Fig. 12 is employed. The tap construction therein shown is similar in all respects to that shown in Fig. 16 but the connecter nipple 72 is provided with an extension 76 below the ports 68 thereby to provide a greater distance between the shoulder 69 and the nipple extremity, whereby upon tightening the gland 72 the valve 40 is not only unseated but the stem 65 is caused to engage and hold unseated the flapper or check valve 48, in such a manner that a high rate of flow through the tap will not be impeded.

In the preferred embodiment of applicant's device, dual safety-release features may be employed, responsive, specifically, to temperature and to pressure although it is to be understood that in case of excessive heat, the pressure within the container will rise thus operating both the pressure-responsive device and the temperature-responsive one, although in some instances one safety feature alone may be sufficient. A longitudinal bore 80 is provided in the tap body, eccentrically located with respect to the axis of the body, and extending from the lower extremity thereof to a point adjacent the upper end of the body where it communicates with a transverse bore 81 which opens to the exterior of the body as at 82 (Fig. 13). A fusible plug 82 normally closes the open end of the bore 81 but upon exposure to temperatures above a predetermined degree, the plug will soften and open the bore, whereupon the contents of the container may escape. A bore 83 extends laterally in a plane parallel with the top surface of the tap and communicates with an enlarged portion 84 thereof forming a chamber 85 which opens to the exterior of the body as at 86. At the juncture of the bore 83 with the enlarged portion 84 an annular extension 87 of the bore 83 provides a seat 88 for a valve 89 having mounted thereon a gasket 90 contained in a recessed portion 91, which is adapted to seal the bore 83 from the chamber and the exterior of the tap body under normal operating conditions. The valve is normally maintained in seated relation by a spring or other loading device 92 held in position by an apertured plug 93 screwthreaded in the chamber 85. Immediately adjacent the annular extension 87 are located transversely extending ports 94 which place the chamber 85 in communication with exterior of the tap body. It is therefore apparent that the plug 93 need not be apertured unless desired. Upon excessive pressure within the container from whatever cause, the valve 89 is unseated against the action of its loading means and the contents may escape through the bores 87 and 94 until the excessive pressure is relieved. This safety device therefore relieves excessive pressures from whatever cause, and if the cause is temporary, the entire contents of the container are not lost. In case it is desired to depend entirely upon the pressure responsive safety device, the fusible plug vent 81 may be permanently sealed as by a plug of brass or other material brazed, welded or secured in place in any convenient manner.

Surrounding the tap and connecter is a ring 100 which serves to protect projecting parts from damage in handling.

During storage of the fuel-filled containers, during transportation, and in the case of multiple container systems, plugs are provided positively to seal the taps against leakage. Plugs of various types are shown in Figs. 6, 19 and 20.

The plug shown in Fig. 6 is particularly adapted for use with the particular tap shown in Fig. 5 although it is apparent that it may also be employed with other taps. It comprises a body portion 110, exteriorly screwthreaded for engagement with the tap, a reduced portion 111 adapted to engage the washer 39 in sealing engagement, a neck portion 112 and a handwheel 113. The neck portion 112 may be made frangible if desired so that a blow upon the handwheel 113 will serve to sever the neck instead of damaging the tap.

A modified plug is illustrated in Fig. 19 and is shown in position in a tap similar to that shown in Fig. 11, in the view shown in Fig. 18. This tap comprises a body portion 120 provided with a reduced portion 121 providing a shoulder 122 for engagement with the gasket 39, a flanged portion 123 provided with screwthreads for engagement with a threaded portion of the chamber 58, and a pair of upwardly extending lugs 124 (Fig. 19). An operating handle 125 is pivotally mounted between the lugs 124 as by a pin 126 so that it may be folded to the position shown in dotted lines in Fig. 18, within the protective confines of the protecting ring 100.

The plug shown in Fig. 20 is similar to that shown in Fig. 19 with the exception that the operating handle is hingedly mounted as by eyebolts or screws 127 engaging apertures 128 in the handle 129.

In Fig. 21 applicant has shown his preferred form of tap in combination with a plug 150, similar in some respects to the plugs previously described, but provided with wings 151 integral with the plug. When employing a plug of this design, the protector ring is extended to such a height that the plug, in position, is entirely within the ring confines and thus is protected from damage by careless handling.

A chain 130 may be provided as shown in each of the modifications to prevent misplacement of the plug, and may be secured to the plug as by a ring 131 and to the ring 100 by a cotter pin or other securing means 132 extending through an aperture 133 in the ring.

A modified form of container is shown in Fig. 16 wherein the container 10 is provided with spaced brackets 140 which support a ring 141. The spaces provide room for the hands to grasp the ring and the assembly therefore provides a combined protector ring and handle.

While I have described specific embodiments of my invention, it is to be understood that other modifications and improvements are contemplated within the scope of the subjoined claims.

Having thus described my invention, what I desire to claim and secure by Letters Patent is:

1. In a tap for containers a body member adapted to be secured in the bung of said container, an internal flange within said body member having an orifice therein, a gasket seated on one side of said flange, a valve element adapted to seat against the other side of said flange to seal said orifice, means normally tending to maintain said valve against said seat, and a flanged nipple having a passageway therethrough extending into said body element and having a portion thereof extending through said gasket and into said orifice, and means to force said nipple into sealing engagement with said gasket and against said valve to unseat the same, said nipple being so constructed and arranged that said nipple is in liquid-tight sealing engagement with said gasket before said valve is unseated.

2. In a connecter tap for containers, a tap body adapted to be secured in said container and having a passage extending therethrough, a packing seat in said passage, a valve in said passage for sealing the same, a second valve adapted to seal said passage when the rate of flow therethrough exceeds a predetermined maximum, a nipple extending within said tap body to seal against said packing and to actuate said first valve, said first valve having means associated therewith to place said second valve out of operation when it is desired to empty said container rapidly.

3. In a valved tap for containers having a nipple extending into said tap in sealing relation therewith to actuate said valve, a pressure relief passage in said tap, a plurality of ports placing said passage in communication with the exterior of said tap, a pressure actuated relief valve controlling one of said ports and a fusible plug normally sealing the other of said ports.

4. In a tap for tapping containers under pressure, a pressure relief passage in said tap, a plurality of ports placing said passage in communication with the exterior of said tap, valve means normally in closed position for sealing one of said ports, and means normally sealing the other of said ports and responsive to abnormal temperatures to open said port.

5. In a tap for tapping containers for fluids under pressure, a pressure relief passage in said tap, a plurality of ports placing said passage in communication with the exterior of said tap, means normally closing one of said ports and responsive to abnormal pressures to open the same, and means normally closing another of said ports responsive to abnormal temperatures to open the same.

6. A connecter tap for containers comprising a body member having a passageway therethrough, a valve in said passageway for sealing the same, a second valve on said body member operative to close said passage in response to flow of fluid therethrough in excess of a predetermined maximum, and means associated with said first valve operable to hold said second valve open when it is desired to empty said container rapidly.

7. A connecter tap for connecting a conduit to a container for fluid under pressure, comprising a tap body adapted to be connected to said container and having a passage therethrough, a seat within said passage, a gasket on one side of said seat, a valve movable in said passage on the other side of said seat adapted to cooperate therewith to seal the passage, a nipple having a bore therein, extending within said passage and through said gasket and adapted to unseat said valve, said nipple being so constructed and arranged that it comes into sealing engagement with said gasket before said valve is unseated.

8. In a device for connecting a conduit to a container under fluid pressure for withdrawing the contents thereof, a tap in said container having a passageway therethrough, means constricting said passageway, valve means in said passageway for completely closing said constriction, a second valve on said tap adapted to close said passageway when rate of flow therethrough exceeds a predetermined amount, a nipple adapted to extend within said passageway to force said first valve into open position, and means associated with said first valve adapted to engage said second valve to hold the same in open position upon insertion of a longer nipple.

9. A valved tap for containers having a passage therethrough, an excess flow check valve adapted to close said passage, a relief passage in said tap so located as to be unaffected by said check valve, and a relief means normally sealing said relief passage but operable under abnormal pressures to open the same.

10. In a self-service system for storing and utilizing liquefied fuel gas, the combination comprising a portable container for the gas, a tap plug closing the container, a valve in the tap plug urged into closing position in direction of gas pressure in the container, a service line for delivery of the gas to gas-consuming appliances, a flexible conduit having one end in communication with the service line, a combined gas pressure regulator and connector on the other end of the flexible conduit, the connector including a nipple cooperating with said valve on insertion into the tap to open said valve to place the interior of the container in communication with said service line, and a follower element rotatably mounted on the connector coacting with the tap to move said nipple into valve opening position.

11. In a self-service system for storing and utilizing liquefied fuel gas, the combination comprising a portable container for the gas, a valved tap in said container, having a passage closed solely by a valve urged in direction of internal pressure, a service line for delivery of the gas to gas-consuming appliances, a flexible conduit having one end in communication with the service line, a gas pressure regulator on the other end of the flexible conduit, a connector rigidly associated with said regulator, said connector including a nipple cooperating with said valved tap on insertion thereinto to operate said valve in the container to place the interior thereof in communication with said service line, a follower element rotatably mounted on the connector coacting with the tap to move said nipple into valve opening position, the tap through the connector forming the sole support for said regulator.

12. In a self-service system for storing and utilizing liquefied fuel gas, a support, a container for the gas detachably connected to the support, a service line for delivery of the gas to gas-consuming appliances associated with the support, a flexible conduit having one end connected to the service line, a gas pressure regulator connected on the other end of the flexible conduit, a connector rigidly attached to the gas pressure regulator and forming an inlet thereto for connection with the container, a valved tap closing the container, a valve in the tap urged into closing position in direction of gas pressure in the container, a nipple on said connector for contact with the valve to open the same, a follower rotatably mounted on the connector for coaction with the tap to move the nipple into valve opening position, the connector in such position acting as sole support for the regulator, a cap enclosing the connector, and means for locking the cap, container, and support together.

ROSSWELL W. THOMAS.